US010883853B2

(12) United States Patent
Petkov et al.

(10) Patent No.: US 10,883,853 B2
(45) Date of Patent: Jan. 5, 2021

(54) METHOD FOR IMPROVING THE TRANSMISSION QUALITY BETWEEN A DATA COLLECTOR AND A PLURALITY OF AUTONOMOUS MEASURING UNITS, AND COMMUNICATION SYSTEM

(71) Applicant: DIEHL METERING SYSTEMS GMBH, Nuremberg (DE)

(72) Inventors: Hristo Petkov, Nuremberg (DE); Thomas Lautenbacher, Erlangen (DE); Thomas Kauppert, Nuremberg (DE); Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/418,197

(22) Filed: May 21, 2019

(65) Prior Publication Data
US 2019/0271565 A1 Sep. 5, 2019

Related U.S. Application Data

(63) Continuation of application No. PCT/EP2017/001313, filed on Nov. 10, 2017.

(30) Foreign Application Priority Data

Dec. 3, 2016 (DE) .................. 10 2016 014 375

(51) Int. Cl.
*G08C 15/06* (2006.01)
*G01D 4/00* (2006.01)
(Continued)

(52) U.S. Cl.
CPC ......... *G01D 4/004* (2013.01); *H04L 27/0014* (2013.01); *H04L 27/16* (2013.01);
(Continued)

(58) Field of Classification Search
CPC ..... G01D 4/004; H04L 27/0014; H04L 27/16; H04L 2027/0026; H04L 2027/0065;
(Continued)

(56) References Cited

U.S. PATENT DOCUMENTS 6,172,616 B1 * 1/2001 Johnson ................. H04W 74/08
340/870.12
6,941,078 B1 * 9/2005 Onaka ................. H04B 10/5051
398/155

(Continued)

FOREIGN PATENT DOCUMENTS

| EP | 1215822 A1 | 6/2002 |
|----|------------|--------|
| WO | 9429825 A1 | 12/1994 |
| WO | 2005099093 A1 | 10/2005 |

*Primary Examiner* — Zhen Y Wu
(74) *Attorney, Agent, or Firm* — Laurence A. Greenberg; Werner H. Stemer; Ralph E. Locher (57) ABSTRACT

A method improves the transmission quality between a data collector and a plurality of metering units. A first communication module is assigned to the data collector and a second communication module is assigned in each case to a metering unit. The second communication module transmits data via radio signals to the first communication module. The first communication module has a first frequency reference device and the second communication module has a second frequency reference device. The radio signals transmitted are dependent on the second frequency reference device. The measurement of a parameter of the radio signal is performed by the first communication module. An estimation of an error of the second frequency reference device on the basis of the parameter measured values is determined. An adjustment of the frequency of the first frequency reference device is performed such that the error is reduced.

38 Claims, 7 Drawing Sheets

(51) Int. Cl.
*H04Q 9/00* (2006.01)
*H04L 27/00* (2006.01)
*H04L 27/16* (2006.01)
*G08C 17/02* (2006.01)

(52) U.S. Cl.
CPC ............... *H04Q 9/00* (2013.01); *G08C 17/02* (2013.01); *H04L 2027/0026* (2013.01); *H04L 2027/0065* (2013.01); *H04Q 2209/40* (2013.01); *H04Q 2209/60* (2013.01); *H04Q 2209/70* (2013.01)

(58) Field of Classification Search
CPC .. H04Q 9/00; H04Q 2209/40; H04Q 2209/60; H04Q 2209/70; G08C 17/02
USPC ........................................... 340/870.03
See application file for complete search history.

(56) References Cited

U.S. PATENT DOCUMENTS

| | | | | |
|---|---|---|---|---|
| 8,300,687 B1* | 10/2012 | Eliezer | ............ | G04R 20/10 375/238 |
| 8,477,444 B1* | 7/2013 | Zou | ............ | G11B 5/746 360/51 |
| 2002/0109607 A1* | 8/2002 | Cumeralto | ............ | H04Q 9/00 340/870.02 |
| 2003/0223513 A1* | 12/2003 | Norris | ............ | H04L 27/18 375/336 |
| 2004/0130358 A1* | 7/2004 | Henry | ............ | H03K 23/667 327/105 |
| 2005/0197092 A1* | 9/2005 | Darabi | ............ | H04B 1/406 455/323 |
| 2007/0104298 A1* | 5/2007 | Filipovic | ............ | H04L 27/2332 375/344 |
| 2007/0260965 A1* | 11/2007 | Schmidt | ............ | H04L 25/4908 714/799 |
| 2008/0001779 A1* | 1/2008 | Cahill-O'Brien | ............ | H04L 27/14 340/870.03 |
| 2009/0115626 A1* | 5/2009 | Vaswani | ............ | G01D 4/004 340/870.02 |
| 2009/0179771 A1* | 7/2009 | Seal | ............ | G01D 4/002 340/870.04 |
| 2010/0202436 A1* | 8/2010 | Albert | ............ | H04W 56/002 370/350 |
| 2012/0314814 A1* | 12/2012 | Xie | ............ | H04L 27/227 375/326 |
| 2013/0321048 A1* | 12/2013 | He | ............ | G01S 19/37 327/156 |
| 2014/0270029 A1* | 9/2014 | Park | ............ | H04L 27/2675 375/362 |
| 2015/0141034 A1* | 5/2015 | Ekbatani | ............ | H04L 25/0204 455/456.1 |
| 2015/0312078 A1* | 10/2015 | Bogdan | ............ | H03L 7/0995 375/226 |
| 2016/0116515 A1* | 4/2016 | Hackett | ............ | H04L 27/2338 368/202 |
| 2017/0223646 A1* | 8/2017 | Romera | ............ | G06F 13/4273 |
| 2018/0041329 A1* | 2/2018 | Wang | ............ | H04W 56/0035 |

* cited by examiner

| Radio parameter | from which the following is determined: | from which the following is determined: |
| --- | --- | --- |
| Bandwidth | Frequency deviation | Crystal error |
| Data rate | Data rate offset | Crystal error |
| Data rate offset | Crystal error | |
| Temperature | Crystal error | |
| Δfrequency | Crystal error | |
| Modulation index | Crystal error | |
| Receive time | Crystal error | |

METHOD FOR IMPROVING THE TRANSMISSION QUALITY BETWEEN A DATA COLLECTOR AND A PLURALITY OF AUTONOMOUS MEASURING UNITS, AND COMMUNICATION SYSTEM

CROSS-REFERENCE TO RELATED APPLICATION

This is a continuation application, under 35 U.S.C. § 120, of copending international application No. PCT/EP2017/001313, filed Nov. 10, 2017, which designated the United States; this application also claims the priority, under 35 U.S.C. § 119, of German patent application No. DE 10 2016 014 375.4, filed Dec. 3, 2016; the prior applications are herewith incorporated by reference in their entirety.

BACKGROUND OF THE INVENTION

Field of the Invention

The present invention relates to a method for improving the transmission quality between a data collector and a plurality of autonomous metering units according to the preamble of the independent method claim, and a corresponding communication system according to the preamble of the independent system claim. The method and the communication system according to the invention are suitable, in particular, for use in the recording of consumption of heat or energy, electricity, gas or water by consumption metering devices.

Intelligent consumption metering devices, also referred to as smart meters, are consumption metering devices incorporated into a supply network, e.g. for heat or energy, electricity, gas or ater, which indicate the actual consumption to the respective connection user and are incorporated into a communication network. Intelligent consumption metering devices offer the advantage that manual meter readings are no longer required and shorter-term billing can be implemented by the provider according to actual consumption. Shorter-term reading intervals in turn enable a more accurate linkage between end customer tariffs and the development of trading prices for electricity. Supply networks can also be substantially more effectively utilized.

Intelligent consumption metering devices are normally assigned in each case to residential units or residential buildings. The metering data generated there can be read in many different ways. Metering data can be read e.g. via the power supply network (Power Line). However, the incorporation of the consumption metering devices into a supra-local network is not possible here. Metering data can furthermore be transmitted using mobile radio communication technology in the form of data packets or messages. However, this is expensive, requires the installation of mobile radio communication modules on the consumption metering devices and has disadvantages in terms of the high power consumption on the individual consumption metering devices. Furthermore, metering data can also be transmitted in the form of data packets or messages via a radio link, for example in the industrial, scientific, medical (ISM) band frequency range or in short range devices (SRD) band frequency range. These frequency ranges offer the advantage that operators require only a general license for frequency management. However, the problem exists that interference can often occur due to the frequency of use of frequency ranges of this type for a wide range of technical devices, such as, for example, garage door controls, alarm systems, WLAN, Bluetooth, smoke detectors, etc. The metering data are collected via a radio link by means of either stationary or mobile data collectors to which the metering data provided in the transmitters of the consumption metering devices are transmitted.

For legal reasons, only metering data which are transmitted during specific, very short set time periods (set time or set point in time, including time deviation) to the data collector may be used by the transmitters of the consumption metering devices for the consumption evaluation. The transmitters of all consumption metering devices transmit their data packets to the receiver of the data collector during these very short set time periods. Data packets received outside the set time periods are rejected. It quite frequently occurs here that the transmissions of metering data from transmitters of different consumption metering devices interfere with one another during the set time period. Building-specific characteristics can also often result in interference in the transmission of the metering data from the consumption metering devices to the data collector. As a result of all these factors, there is only a moderate probability that the data packets will be successfully transmitted in the channel concerned.

A further difficulty is that communication systems with two-way radio transmission between the data collector and the consumption metering devices require very precise time synchronization between the communication modules located in the area of the consumption metering devices and those of the data collector. Simple crystals with low power consumption are used as frequency reference devices, particularly in the area of the communication modules of autonomous consumption metering devices. Crystals of this type have crystal errors of 10-100 ppm due to manufacturing tolerances, temperature behavior and ageing. In a standard crystal, for example, a crystal error of 50 ppm results in a deviation of 4.3 seconds per day or 26 minutes per annum. This in turn results in an increasing deviation in the time synchronization with the consequence of an increasingly deteriorating receive behavior.

SUMMARY OF THE INVENTION

The object of the present invention is to provide a generic method and a generic communication system with which an improved reception between consumption metering devices and a data collector is possible.

The above object is achieved in the method according to the invention by the features of the independent method claim and in the communication system according to the invention by the features of independent system claim.

Appropriate designs of the method and communication system according to the invention are set out in the dependent claims.

The need for a frequency measurement, including the hardware required for this purpose, is eliminated in that the error of the second frequency device (crystal error) of the second communication module is derived by measuring at least one parameter or a plurality of parameters from the parameter group containing bandwidth and/or data rate and/or data rate offset (or data rate error or sampling offset) and/or temperature from the data packet from the data packet and/or a Δfrequency derived from the second frequency reference device and/or modulation index and/or receive time and subsequent estimation on the basis of the determined parameter values. The error can be estimated in a simple manner in a software-based mathematical approximation model. This is particularly advantageous in the area of the first communication module, i.e. the data collector, since an increased processing power is available there in contrast to the respective second communication modules which are assigned to the metering units or to the consumption metering devices. A preliminary routine can appropriately be provided here for estimating the crystal error in which a check is carried out to determine whether the crystal error determined through estimation is of such a quality that it does or does not affect or restrict the transmission quality of the radio signals. The frequency of the first frequency reference device and/or at least one parameter in the first communication module from the group comprising data rate, data rate offset, modulation index and frequency deviation can be adjusted depending thereon by reducing or eliminating the determined parameter deviation and therefore the error of the second frequency reference device. This enables the first communication module to adjust the communication to the second communication module and thereby optimize the quality of the transmission between the first and second communication module therefore between the metering unit and the data collector. The probability of a correctly received data packet in the operational situation described above is in turn increased as a result.

According to one appropriate design of the present invention, the bandwidth of the received radio signals is measured and the data rate error or data rate offset is determined therefrom. The error of the second frequency reference device is in turn determined on the basis of the data rate offset determined in this way. The bandwidth is used here as a measure of the data rate offset.

Alternatively or additionally, it is possible to measure the phase deviation of the received radio signals and determine the frequency deviation therefrom. The error of the second frequency reference device can in turn be determined with the frequency deviation.

The data rate and the crystal error can also be determined via the frequency deviation using the modulation index of the received radio signals.

The data rate offset, frequency deviation and receive time parameters can also be determined or measured directly and the crystal error can be estimated on the basis of the measurement results.

In order to carry out a frequency correction, default correction values (register settings) are specified for the parameter(s) concerned in a lookup table for the selection of specific characteristic values. Depending on the mathematical determination of the error of the second frequency reference device, specific default correction values are selected from the specified set of default correction values. The crystal error adjustment or the adjustment of the first frequency device is performed depending thereon.

The respective second communication modules (i.e. the respective metering units or consumption metering devices) are preferably processed sequentially. Frequency data of the individual metering units do not therefore have to be stored in a database.

Alternatively or additionally, the hardware of the first frequency device can also be adjusted directly depending on the determined parameters. This can be done, for example, by performing a setting on the hardware (e.g. by applying a voltage to a varactor diode) of the first communication module.

The two-way communication between the respective meter and the data collector can be optimized in that the error of the radio signal received by the first communication module is reduced or eliminated in the latter and a correspondingly corrected radio signal is transmitted back to the second communication module.

A continuous increase in the modulation index error over the length of the respective data packet is avoided in that the modulation index is determined and adjusted as a radio parameter. This offers the advantage that longer data packet lengths than previously possible can now be achieved by adjusting the modulation index of the modulation index error. This in turn enables the concomitant transmission of additional data, e.g. security data or cryptographic data for an effective encryption. This is particularly advantageous in the case of an FSK or MSK modulation.

When the data packet is received, the receive frequency can appropriately be set on the data collector in such a way that the signal is located in the middle of the receive window. The metering unit can furthermore reply to the data collector with the setting. This guarantees that the procedure can be performed sequentially, i.e. metering unit by metering unit.

The second communication module can furthermore comprise a third frequency reference device with a more frequency-stable crystal oscillator, e.g. an HF crystal. As a result, the frequency of the more frequency-stable third frequency reference device can be used to derive the Δfrequency of the second frequency reference device, i.e. the frequency of the more frequency-stable third frequency reference device serves as a frequency reference point for the second frequency reference device.

The present invention furthermore relates to a communication system, also claimed secondarily, according to the preamble to the independent system claim. This communication system is characterized in that the first communication module has a measuring device to measure at least one parameter of the radio signal received from the second communication module from the following parameter group: bandwidth and/or data rate and/or data rate offset (or data rate error) and/or temperature from the data packet and/or from a Δfrequency derived from the second frequency reference device and/or modulation index and/or receive time. The first communication module has a control and processing unit or is at least connected to it, the unit mathematically determining an error of the second frequency reference device on the basis of the parameter measured values or values derived therefrom.

The error of the second frequency reference device or the parameter error dependent thereon can furthermore be reduced or eliminated by adjusting the frequency of the first frequency reference device and/or at least one parameter in the first communication module from the group comprising data rate, data rate offset, modulation index and frequency deviation.

Other features which are considered as characteristic for the invention are set forth in the appended claims.

Although the invention is illustrated and described herein as embodied in a method for improving the transmission quality between a data collector and a plurality of autonomous measuring units, and a communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
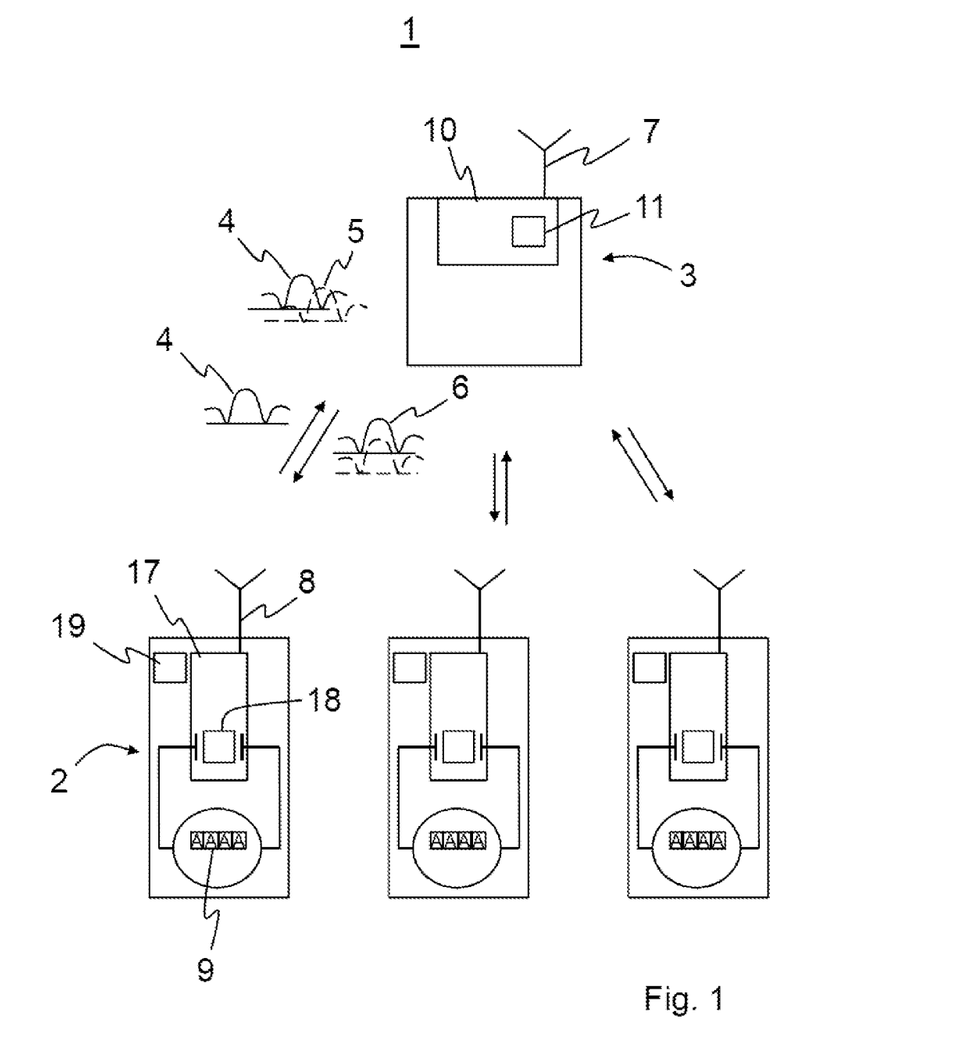
FIG. 1 is an illustration of a substantially simplified schematic view of a data collector and a plurality of associated consumption metering devices.

Referring now to the figures of the drawings in detail and first, particularly to FIG. 1 thereof, there is shown a communication system 1 which has a plurality of metering units or consumption metering devices 2. The consumption metering devices 2 are, for example, water meters, energy meters or heat meters, gas meters, electricity meters or the like. Consumption metering devices 2 of this type operate autonomously, i.e. they are equipped with their own power supply (battery). They are normally located in the building installation, e.g. in the cellar of a single-family dwelling or on the respective floor of an apartment block. The respective consumption metering device 2 normally has a display 9 which enables a totaled meter reading of the consumption metering device 2. Each consumption metering device 2 furthermore has a communication module (second communication module 17), a control and processing unit 19, a crystal oscillator (second frequency reference device 18) and an antenna 8.

The communication system 1 furthermore has a data collector 3 with a frequency reference device 11 which is installed remotely from the individual consumption metering devices 2, e.g. on the roof of a building, and serves to receive data in the form of data packets from the respective assigned consumption metering devices 2. The data packets are formed by radio messages 4 which are transmitted at specific times from the consumption metering device 2 to the data collector 3. The SRD band and/or the ISM band which provide(s) license-free frequency bandwidths for many different applications are preferably used for the transmission.

The radio message 4 transmitted by the respective consumption metering device 2 is defined by the crystal oscillator of the relevant consumption metering device 2. If the crystal oscillator has an error, this error is also invariably concomitantly transmitted via the radio message 4 to the data collector 3.

Due to the error of the crystal oscillator of the consumption metering device 2, the radio message 4 has a different frequency or is located in a different channel compared with the data collector 3. This is represented symbolically in FIG. 1 by the radio message 5 "expected by the data collector 3", indicated by a dotted line. In an ideal communication between the consumption metering device 2 and the data collector 3, the consumption metering device 2 should transmit a radio message corresponding to the radio message 5 to the data collector 3.

According to the concept of the present invention, the data collector 3, on receiving the radio message 4 from the respective consumption metering device 2, now measures a special radio parameter or a plurality of special radio parameters, the data collector 3 performs an approximate estimation of the error of the second frequency reference device 18 on the basis of the measured radio parameters and modifies its own frequency reference device 11 in such a way that an identified difference in the parameter(s) concerned is eliminated or at least reduced. The data collector 3 thus adjusts itself in terms of its own frequency or those of the frequency channel in such a way that the frequencies of the second communication module 17 and the first communication module 10 at least fundamentally match one another. A radio message 6 correspondingly adjusted by the data collector 3 is transmitted from the data collector 3 back to the consumption metering device 2 (downlink), In this way, the relevant consumption metering device 2 knows that a coordinated, improved communication can take place. The relevant adjustment of the radio message 6 is evident in that the latter matches the radio message expected by the data collector (indicated by a dotted line) in terms of its frequency position.

Figure 2:
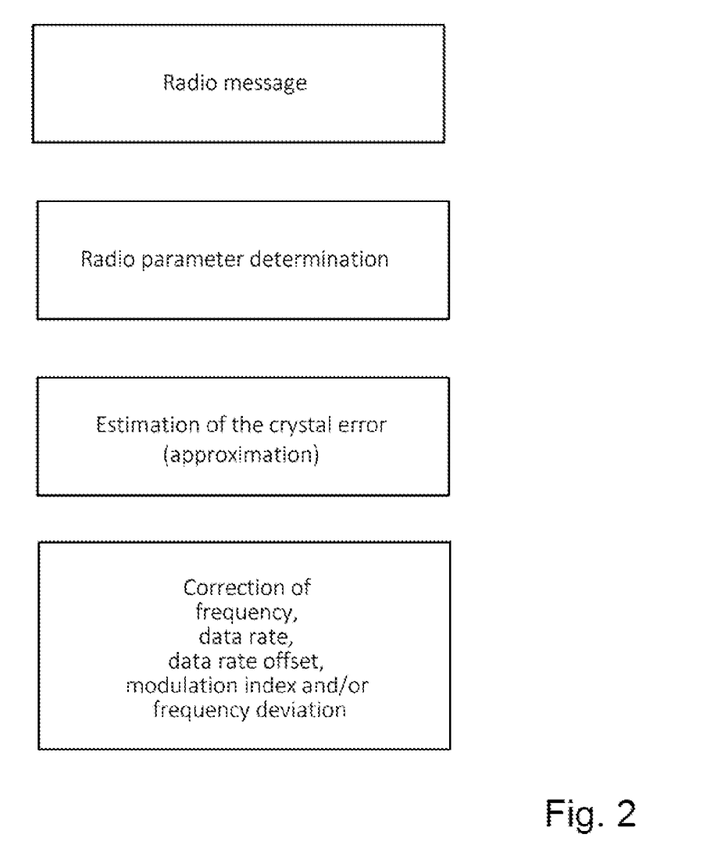
FIG. 2 is an illustration of a substantially simplified schematic view of the basic principle of the present invention.

FIG. 2 shows the basic concept in a block diagram. The radio message 4 transmitted by the consumption metering device 2 is examined in terms of at least one fixed, predefined radio parameter and an estimation of the error of the crystal oscillator of the respective consumption metering device 2 is performed on the basis of the radio parameter(s). The crystal error estimation is preferably performed here via a mathematical model, e.g. in the form of an integral transform, preferably in the form of a Fourier transform or spectral transform. This approximate estimation can advantageously be carried out using software. The processing power of the control and processing unit 13 of the data collector 3, for example, is available for this purpose. Alternatively, the data collector 3 can also be connected to an external control and processing element (for example a cloud computer).

Figure 3:
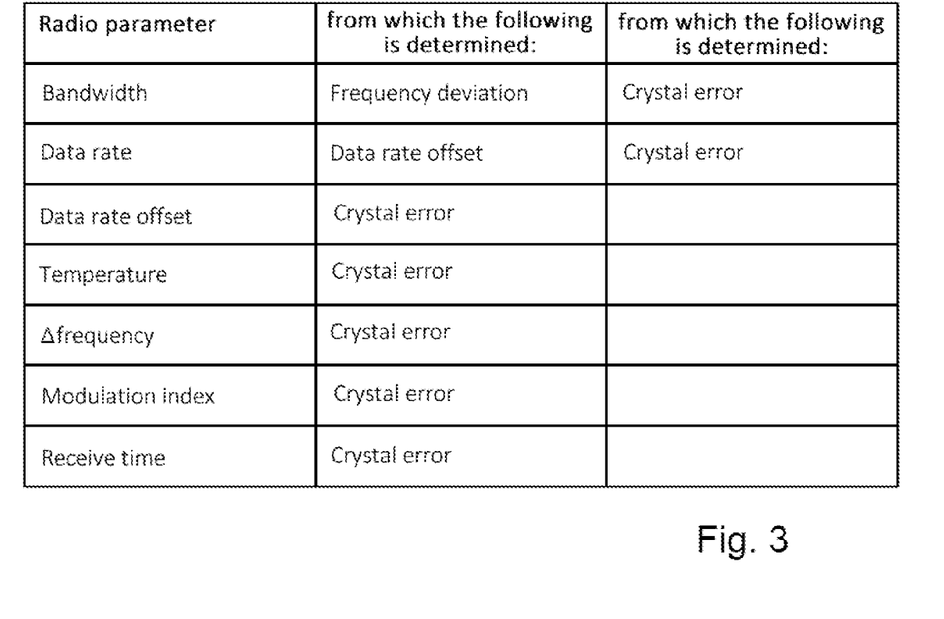
FIG. 3 is an illustration showing a listing of the radio parameters to be determined.

The table in FIG. 3 shows a set of radio parameters suitable according to the invention for estimating the error of the crystal oscillator of the consumption metering device 2. The bandwidth of the transmitted radio signals, for example, can be used as a radio parameter and the frequency deviation can be determined therefrom. The crystal error can in turn be inferred via the frequency deviation.

Alternatively or additionally, the data rate offset, i.e, a difference between the actually transmitted data rate and the data rate expected by the data collector 3, can also be used as a radio parameter. As a result of the data rate offset, the symbol concerned is captured at an earlier or later time in the data collector 3. The incorrect time also results in a phase error which impairs the performance of the transmission. The crystal error can in turn be approximately inferred from the data rate offset.

Differences in the radio signal receive time also provide a direct indication of the crystal error.

A deviation in the modulation index can also be identified from the frequency deviation radio parameter and the crystal error can be determined therefrom.

The consumption metering device 2 determines the temperature by means of a temperature measuring device, e.g. a temperature sensor, and sends the temperature information via the second communication module 17 to the first communication module 10 of the data collector 3. The data collector 3 can determine the crystal error from the temperature data, for example by comparing the temperature values with temperature values stored in a calibration table.

Figure 7:
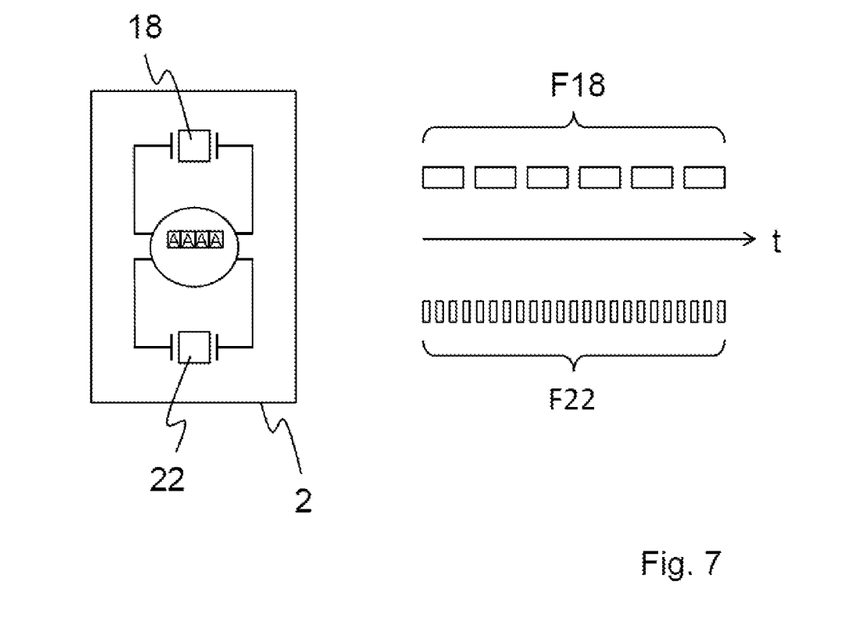
FIG. 7 is an illustration of a substantially simplified schematic view of a consumption metering device with two frequency reference devices and a view of the frequencies of the respective frequency reference device.

According to FIG. 7, the consumption metering device 2 can furthermore also comprise a third frequency reference device 22 which has a better frequency stability than the second frequency reference device 18 with a normally increased energy consumption. A clock crystal, for example, can be provided as the second frequency reference device 18 with a clock frequency of around 32 kHz and an HF crystal with a clock frequency of around 20 MHz can be provided as the third frequency reference device 22. The second frequency reference device 18 is operated continuously here and the third frequency reference device 22 only intermittently in order to use the frequency, the cycle duration or a different derivable quantity of the third frequency reference device 22 as a clock measure and to determine the crystal error of the second frequency reference device 18 therefrom. For this purpose, the frequency F18, for example, of the second frequency reference device 18 can be compared with the frequency F22 of the more frequency-stable third frequency reference device 22. A deviation or frequency difference Δfrequency, e.g. of the determined frequency F18 from the expected frequency value of the frequency 18 correspondingly provides direct indications of the crystal error of the crystal oscillator of the second frequency reference device 18.

Figure 8:
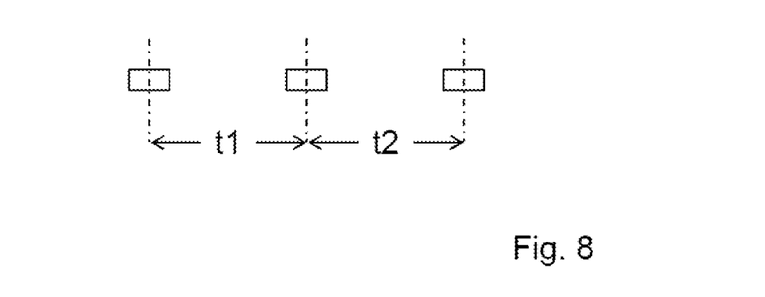
FIG. 8 is an illustration of a substantially simplified schematic view of the time intervals between two data packets.

The time intervals between the data packets, e.g. 5 seconds, are furthermore known. The limits of the time intervals t1, t2 between the data packets can be located according to FIG. 8 as time information or a time signal or time reference in the middle area of the data packet. The time intervals t1, t2 can thereby be determined as precisely as possible as time intervals t1' and t2' and can be compared with the expected time intervals t1 and t2. The frequency can then be determined via the determined time intervals t1' and t2' and the Δfrequency of the crystal oscillator of the second frequency reference device 18, e.g. by: frequency=t1'+Δfrequency.

If required, all of the aforementioned radio parameters can be used to determine the crystal error or a combination of a part thereof.

Following the performance of the crystal error calculation, a check is preferably first carried out in a subroutine to determine whether the crystal oscillator of the consumption metering device 2 has a performance-restricting influence. If the error is only minor, no adjustment is made. However, if the error is greater, an adjustment is made in the data collector 3.

Figure 4:
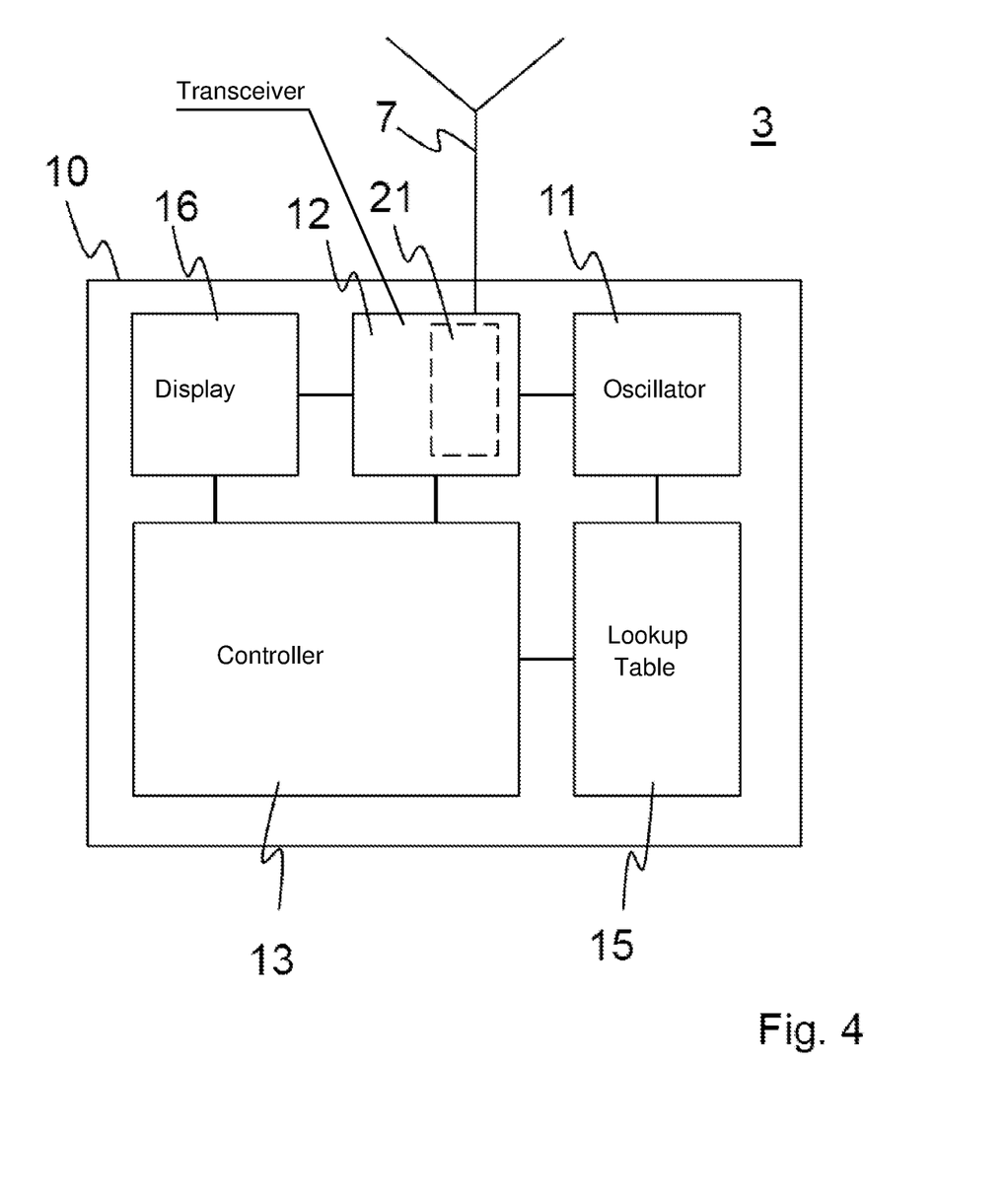
FIG. 4 is a block diagram of a first design of the data collector as a component of the communication system according to the invention.
Figure 5:
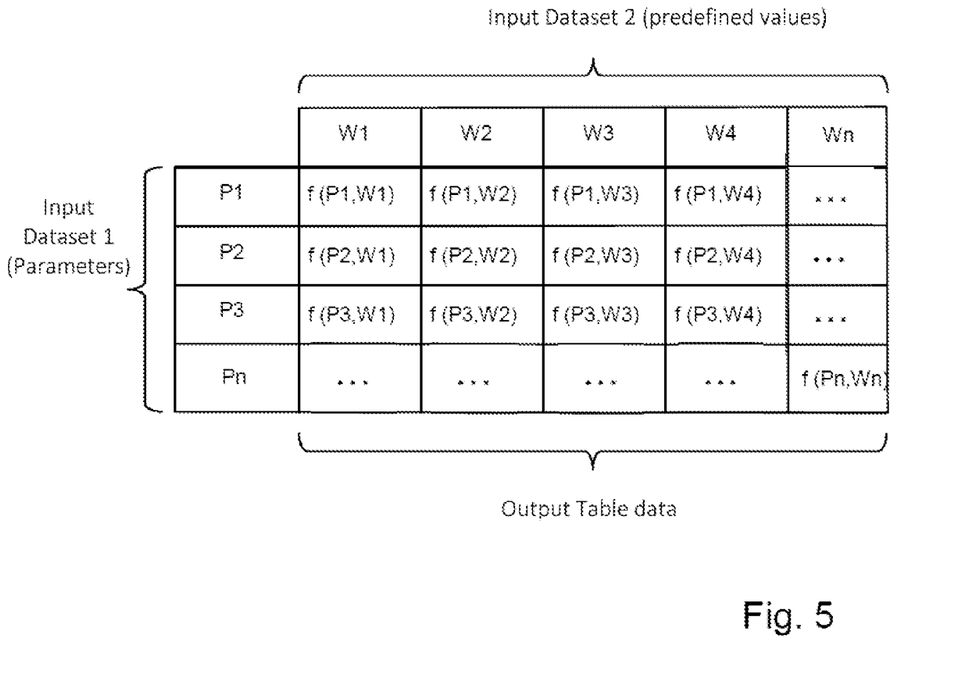
FIG. 5 is an illustration of a substantially simplified schematic view of a lookup table.

FIG. 4 shows an appropriate design of the first communication module 10 of the data collector 3 in a substantially simplified, but enlarged, view. The communication module 10 contains a transceiver part 12 with an antenna 7, a crystal oscillator (first frequency reference device 11) which is connected to a control and processing unit 13, and preferably a display 16. The transceiver part 12 contains a measuring device 21 to record the aforementioned radio parameters. A lookup table 15 is furthermore provided which enables a modification to be made to the frequency of the data collector 3 depending on the measured parameter(s) of the radio signal. According to FIG. 5, the lookup table 15 contains a plurality of inputs for the respective parameter data P1-Pn measured or further processed by the data collector 3. The lookup table 15 furthermore contains a plurality of empirical input values W1-Wn which are suitable for correlation with the parameter input data. Depending on the respective parameter input data, a suitable output signal is thus sent via the lookup table 15 to the first frequency reference device 11 of the data collector 3 so that the frequency of the first frequency reference device 11 of the data collector 3 can be adjusted accordingly.

The adjustment of the frequency of the first frequency reference device 11 of the data collector 3 in relation to the respective consumption metering device 2 is performed sequentially, i.e. from consumption metering device to consumption metering device, until a corresponding coordination has been carried out with all consumption metering devices 2. Only one radio parameter measured value is to be stored. A database for storing a multiplicity of radio parameter values is not necessary.

Figure 6:
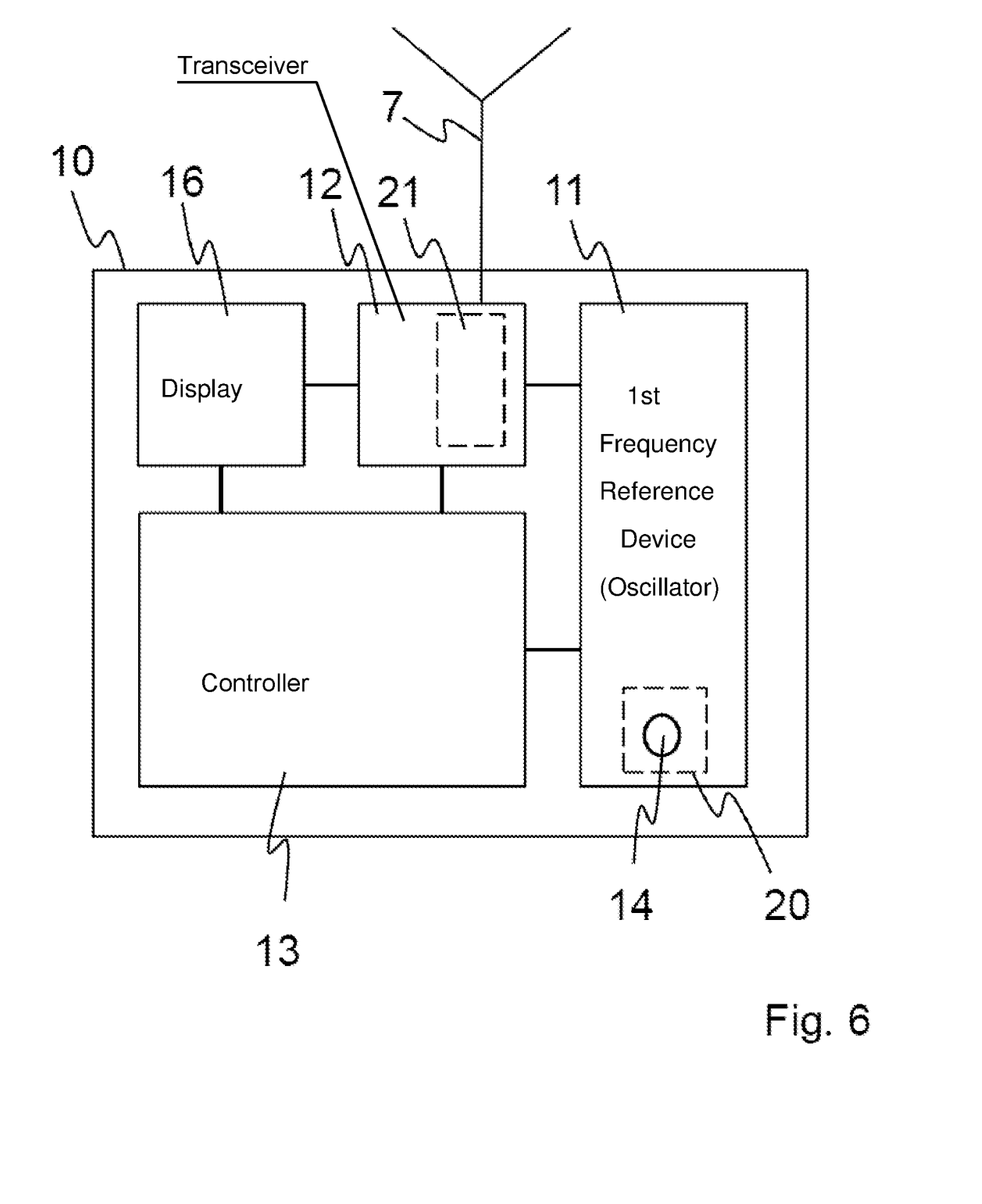
FIG. 6 is a block diagram of a further design of the data collector as a component of the communication system according to the invention.

Instead of or in addition to the lookup table 15, a modification of the hardware of the first frequency reference device 11 for the frequency adjustment can also be provided by a manually operable adjusting element, e.g. by use of a varactor diode 20 provided with a final control element 14, as shown in FIG. 6.

According to the present invention, a minimum shift keying (MSK) modulation can be used which is coherently demodulated. The MSK modulation is in turn generated by frequency shift keying (FSK) modulation which has a modulation index of 0.5. The phase of the symbols must be known in order to be able to decode such modulation types coherently. If the phase of the symbol in the consumption metering device 2 is corrupted, this results in a performance degradation (measured in terms of robustness of the interference source or sensitivity) to the point of loss of functionality. In particular, the phase is corrupted by the modulation index error. The two FSK frequencies are transmitted with a spacing of ΔF (frequency deviation) around the carrier. The modulation index error is defined as 2ΔF (frequency deviation)×T (symbol period). The two FSK frequencies are slightly corrupted by the modulation index error. This results in a propagating phase error in the receiver. The longer the message is, the more the modulation index error accumulates. The modulation index error therefore hitherto represented a limit to the telegram length. If the frequency deviation changes due to an error of the crystal oscillator 18 of the second communication module 17, this results in a modification of the modulation index error. The invention enables the modulation index or the modulation index error to be set or corrected (or reduced) on the data collector, as a result of which it is possible to transmit considerably longer radio messages than previously. Greater packet lengths or longer radio messages can preferably be used to incorporate additional encryptions into the radio messages, resulting in an improved transmission security with simultaneously improved transmission quality.

The following is a summary list of reference numerals and the corresponding structure used in the above description of the invention:
1 Communication system
2 Consumption metering device 3 Data collector
4 Radio message transmitted by the consumption metering device
5 Radio message expected by the data collector
6 Radio message adjusted by the data collector
7 Antenna
8 Antenna
9 Display
10 First communication module
11 First frequency reference device (data collector)
12 Transceiver part (data collector)
13 Control and processing unit (data collector)
14 Final control element
15 Lookup table
16 Display
17 Second communication module (consumption metering device)
18 Second frequency reference device (consumption metering device)
19 Control and processing unit (consumption metering device)
20 Varactor diode
21 Measuring device
22 Third frequency reference device (consumption metering device)
F18 Frequency of the second frequency reference device
F22 Frequency of the third frequency reference device
t Time
t1 Time interval
t2 Time interval

The invention claimed is:

1. A method for improving a transmission quality between a data collector and a plurality of metering units in a communication system, which comprises the steps of:
assigning a first communication module to the data collector;
providing at least two second communication modules, one of said second communication modules assigned in each case to a metering unit, the second communication modules are provided to transmit data by means of radio signals in a form of radio messages having at least one data packet to the first communication module;
receiving, via the first communication module, the data from the second communication modules, the first communication module having a first frequency reference device and each of the second communication modules having a second frequency reference device, wherein the radio signals transmitted in each case during a data transmission from the second communication modules to the first communication module are dependent on the second frequency reference device;
measuring at least one parameter of a radio signal transmitted by a respective one of the second communication modules and received by the first communication module, the parameter selected from the group consisting of a bandwidth, a data rate, a data rate offset, a temperature from a data packet, a frequency deviation derived from the second frequency reference device, a modulation index and a receive time;
deriving, via the first communication module, an estimation of an error of the second frequency reference device on a basis of parameter measured values or values derived from the parameter measured values; and
performing, via the first communication module, an adjustment of frequencies of the first frequency reference device and at least one parameter in the first communication module selected from the group consisting of a data rate, a data rate offset, and a modulation index in such a way that the error of the second frequency reference device or a parameter error dependent thereon is reduced or eliminated.

2. The method according to claim 1, which further comprises:
measuring the bandwidth;
determining the data rate offset from a measured bandwidth; and
estimating the error of the second frequency reference device from the data rate offset.

3. The method according to claim 1, which further comprises:
measuring a phase deviation;
determining the frequency deviation from a measured phase deviation; and
estimating the error of the second frequency reference device from the frequency deviation.

4. The method according to claim 1, which further comprises:
specifying default correction values for the parameter concerned in a lookup table;
depending on an estimated error of the second frequency reference device, selecting specific default correction values) from a specified set of the default correction values; and
adjusting the first frequency reference device depending on the specific default correction values.

5. The method according to claim 4, which further comprises adjusting hardware of the first frequency reference device in dependence on the estimated error of the second frequency reference device.

6. The method according to claim 1, which further comprises:
reducing or eliminating the error of the radio signal received by the first communication module in the first communication module; and
transmitting back a correspondingly corrected radio signal to the respective second communication module.

7. The method according to claim 1, which further comprises using frequency shift keying modulation for a transmission of the radio signals.

8. The method according to claim 1, which further comprises using minimum shift keying modulation for a transmission of the radio signals.

9. The method according to claim 1, which further comprises performing the data transmission from the respective second communication module to the first communication module successively or sequentially in relation to further ones of the second communication modules.

10. The method according to claim 1, which further comprises estimating the error of the second frequency reference device via an integral transform.

11. The method according to claim 1, wherein when the data packet is received, setting a receive frequency on the data collector in such a way that a signal is located in a middle of a receive window.

12. The method according to claim 1, which further comprises:
providing the respective second communication module with a third frequency reference device; and
using a frequency of the third frequency reference device to derive the frequency deviation from the second frequency reference device.

13. The method according to claim 10, wherein the integral transform is a Fourier transform or spectral transform.

14. A communication system with two-way radio transmission, comprising:
   a data collector;
   a first communication module assigned to said data collector;
   metering units;
   at least two second communication modules, wherein one of said second
   communication modules is assigned in each case to one of said metering units, said second communication modules provided to transmit data by means of radio signals, in a form of radio messages having at least one data packet to said first communication module;
   said first communication module is provided to receive the data from said second communication modules;
   said first communication module has a first frequency reference device;
   each of said second communication modules having a second frequency reference device, wherein the radio signals transmitted in each case during a data transmission from said second communication modules to said first communication module are dependent on said second frequency reference device;
   a device provided to correct the data on a basis of a deviation between said first frequency reference device and said second frequency reference device;
   said first communication module having a measuring device to measure at least one parameter of a radio signal transmitted by a respective one of said second communication modules and received by said first communication module, the parameter selected from the group consisting of:
   bandwidth,
   data rate,
   data rate offset,
   temperature from the data packet,
      a frequency deviation derived from said second frequency reference device,
      a modulation index; and
      a receive time; and
   said first communication module having a control and processing unit, said control and processing unit determining, through estimation, an error of said second frequency reference device on a basis of parameter measured values or values derived from the parameter measured values;
   wherein the error of said second frequency reference device or a parameter error dependent thereon is reduced or eliminated by performing an adjustment of a frequency of said first frequency reference device and at least one parameter in said first communication module selected from the group consisting of a data rate, a data rate offset, and a modulation index.

15. The communication system according to claim 14, wherein comparative values are stored in relation to parameters for comparison with the measured values, and said control and processing unit estimates the error of said second frequency reference device on a basis of a difference between the comparative values and the measured values.

16. The communication system according to claim 14, wherein:
   default correction values for the parameter concerned are specified in a lookup table; and
   depending on an estimated error of said second frequency reference device, specific default correction values are selectable therefrom and an adjustment of said first frequency reference device can be performed through corresponding selection.

17. The communication system according to claim 14, wherein said first communication module has a final control element and by means of said final control element a frequency of said first communication module is modifiable.

18. The communication system according to claim 14, wherein said metering units are consumption meters.

19. The communication system according to claim 14, wherein said communication system is configured to carry out the method according to claim 1.

20. A method for improving a transmission quality between a data collector and a plurality of metering units in a communication system, which comprises the steps of:
   assigning a first communication module to the data collector;
   providing at least two second communication modules, one of said second communication modules assigned in each case to a metering unit, the second communication modules are provided to transmit data by means of radio signals in a form of radio messages having at least one data packet to the first communication module;
   receiving, via the first communication module, the data from the second communication modules, the first communication module having a first frequency reference device and each of the second communication modules having a second frequency reference device, wherein the radio signals transmitted in each case during a data transmission from the second communication modules to the first communication module are dependent on the second frequency reference device;
   measuring at least one parameter of a radio signal transmitted by a respective one of the second communication modules and received by the first communication module, the parameter selected from the group consisting of a bandwidth, a data rate, a data rate offset, a temperature from a data packet, a frequency deviation derived from the second frequency reference device, a modulation index and a receive time;
   deriving, via the first communication module, an estimation of an error of the second frequency reference device on a basis of parameter measured values or values derived from the parameter measured values; and
   performing, via the first communication module, an adjustment of radio carrier frequencies derived from at least one parameter in the first communication module selected from the group consisting of a data rate, a data rate offset, and a modulation index in such a way that the error of the second frequency reference device or a parameter error dependent thereon is reduced or eliminated.

21. The method according to claim 20, which further comprises:
   measuring the bandwidth;
   determining the data rate offset from a measured bandwidth; and
   estimating the error of the second frequency reference device from the data rate offset.

22. The method according to claim 20, which further comprises:
   measuring a phase deviation;
   determining the frequency deviation from a measured phase deviation; and estimating the error of the second frequency reference device from the frequency deviation.

23. The method according to claim 20, which further comprises:
specifying default correction values for the parameter concerned in a lookup table;
depending on an estimated error of the second frequency reference device, selecting specific default correction values) from a specified set of the default correction values; and
adjusting the first frequency reference device depending on the specific default correction values.

24. The method according to claim 23, which further comprises adjusting hardware of the first frequency reference device in dependence on the estimated error of the second frequency reference device.

25. The method according to claim 20, which further comprises:
reducing or eliminating the error of the radio signal received by the first communication module in the first communication module; and
transmitting back a correspondingly corrected radio signal to the respective second communication module.

26. The method according to claim 20, which further comprises using frequency shift keying modulation for a transmission of the radio signals.

27. The method according to claim 20, which further comprises using minimum shift keying modulation for a transmission of the radio signals.

28. The method according to claim 20, which further comprises performing the data transmission from the respective second communication module to the first communication module successively or sequentially in relation to further ones of the second communication modules.

29. The method according to claim 20, which further comprises estimating the error of the second frequency reference device via an integral transform.

30. The method according to claim 20, wherein when the data packet is received, setting a receive frequency on the data collector in such a way that a signal is located in a middle of a receive window.

31. The method according to claim 20, which further comprises:
providing the respective second communication module with a third frequency reference device; and
using a frequency of the third frequency reference device to derive the frequency deviation from the second frequency reference device.

32. The method according to claim 29, wherein the integral transform is a Fourier transform or spectral transform.

33. A communication system with two-way radio transmission, comprising:
a data collector;
a first communication module assigned to said data collector;
metering units;
at least two second communication modules, wherein one of said second
communication modules is assigned in each case to one of said metering units, said second communication modules provided to transmit data by means of radio signals, in a form of radio messages having at least one data packet to said first communication module;
said first communication module is provided to receive the data from said second communication modules;
said first communication module has a first frequency reference device;
each of said second communication modules having a second frequency reference device, wherein the radio signals transmitted in each case during a data transmission from said second communication modules to said first communication module are dependent on said second frequency reference device;
a device provided to correct the data on a basis of a deviation between said first frequency reference device and said second frequency reference device;
said first communication module having a measuring device to measure at least one parameter of a radio signal transmitted by a respective one of said second communication modules and received by said first communication module, the parameter selected from the group consisting of:
bandwidth,
data rate,
data rate offset,
temperature from the data packet,
a frequency deviation derived from said second frequency reference device,
a modulation index; and
a receive time; and
said first communication module having a control and processing unit, said control and processing unit determining, through estimation, an error of said second frequency reference device on a basis of parameter measured values or values derived from the parameter measured values;
wherein the error of said second frequency reference device or a parameter error dependent thereon is reduced or eliminated by performing an adjustment of a radio carrier frequency derived from at least one parameter in said first communication module selected from the group consisting of a data rate, a data rate offset, and a modulation index.

34. The communication system according to claim 33, wherein comparative values are stored in relation to parameters for comparison with the measured values, and said control and processing unit estimates the error of said second frequency reference device on a basis of a difference between the comparative values and the measured values.

35. The communication system according to claim 33, wherein:
default correction values for the parameter concerned are specified in a lookup table; and
depending on an estimated error of said second frequency reference device, specific default correction values are selectable therefrom and an adjustment of said first frequency reference device can be performed through corresponding selection.

36. The communication system according to claim 33, wherein said first communication module has a final control element and by means of said final control element a frequency of said first communication module is modifiable.

37. The communication system according to claim 33, wherein said metering units are consumption meters.

38. The communication system according to claim 26, wherein said communication system is configured to carry out the method according to claim 20.

* * * * *